United States Patent [19]
House

[11] Patent Number: 5,697,742
[45] Date of Patent: Dec. 16, 1997

[54] APPARATUS FOR DIVIDING AND STABILIZING CARGO IN THE BED OF PICK-UP TYPE VEHICLES

[76] Inventor: Thomas A. House, 1032 Irving St. #333, San Francisco, Calif. 94122

[21] Appl. No.: 733,596

[22] Filed: Oct. 18, 1996

Related U.S. Application Data

[60] Provisional application No. 60/006,999 Nov. 20, 1995.

[51] Int. Cl.$^6$ ....................................................... B60P 7/14
[52] U.S. Cl. ............................ 410/127; 410/121; 410/129; 410/140; 410/151
[58] Field of Search ..................................... 410/121, 127, 410/128, 129, 140, 151, 143; 248/354.1, 345.5, 354.6; D12/406, 414, 223; 224/403, 405, 549, 550, 551, 925; 296/39.2, 37.5, 37.6, DIG. 1; 220/531, 551, 552; 211/175

[56] References Cited

U.S. PATENT DOCUMENTS

| | | | |
|---|---|---|---|
| D. 248,228 | 6/1978 | Robertson | D12/223 |
| D. 300,734 | 4/1989 | Kruitbosch | D12/414 |
| 2,715,040 | 8/1955 | Rhoads, Sr. | 410/140 |
| 2,978,993 | 4/1961 | Hall | 410/129 |
| 3,345,955 | 10/1967 | Erickson | 410/127 |
| 4,236,854 | 12/1980 | Rogers | 410/121 |
| 4,498,824 | 2/1985 | Kinkle | 410/121 |
| 4,737,056 | 4/1988 | Hunt | 410/151 |
| 4,834,599 | 5/1989 | Gordon et al. | 410/151 |
| 4,917,429 | 4/1990 | Giger | 296/37.6 |
| 4,986,706 | 1/1991 | Willams, Jr. | 410/129 |
| 5,028,185 | 7/1991 | Shannon | 410/151 |
| 5,044,682 | 9/1991 | Wayne | 296/39.2 |
| 5,082,404 | 1/1992 | Stewart et al. | 410/127 |
| 5,265,993 | 11/1993 | Wayne | 410/129 |
| 5,522,685 | 6/1996 | Lessard | 410/121 |
| 5,526,972 | 6/1996 | Frazier et al. | 220/531 X |

FOREIGN PATENT DOCUMENTS

| | | | |
|---|---|---|---|
| 291298A | 6/1991 | Germany | 410/129 |
| 0466550 | 1/1969 | Switzerland | 248/354.5 |

*Primary Examiner*—Stephen Gordon

[57] ABSTRACT

An easily adjustable apparatus for dividing and stabilizing cargo in the bed of a pick-up type vehicle, or the like. The embodiment comprises four main components: Two primary lateral assemblies (20), one-center locking swivel hinge (28), two tangential arm locking assemblies (35), and two tangential arm assemblies (45). The two primary lateral assemblies (20), and tangential arm assemblies (45), are extendible and fitted with end plates to engage any type of surface of the four interior bed walls. The two primary lateral assemblies (20), are connected with a center locking swivel hinge (28), locking the two primary lateral assemblies (20), in the desired position. Each tangential arm locking assembly (35), is welded to a primary lateral assembly (20), and locks the tangential arm assembly (45), to any desired position. This apparatus has four positions to secure cargos and requires no attachment to any surfaces in the interior of the beds and is collapsible for easy storage.

1 Claim, 3 Drawing Sheets

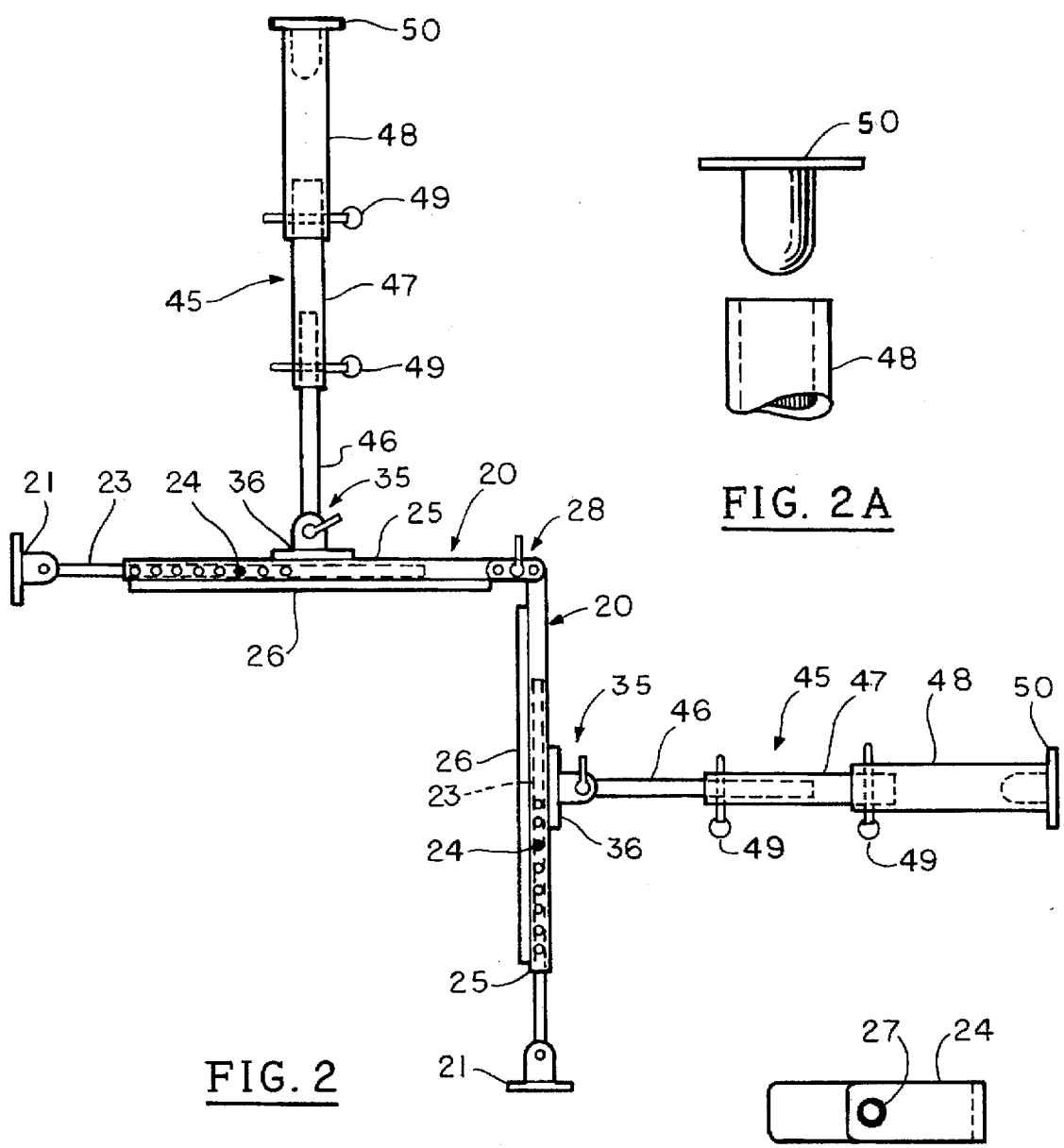
FIG. 2A
FIG. 2
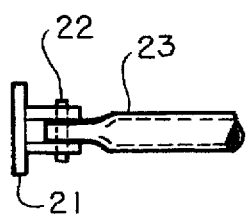
FIG. 2B
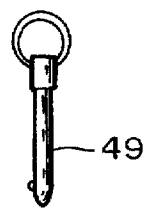
FIG. 2C
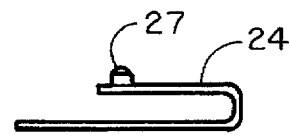
FIG. 2D
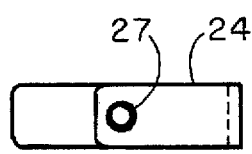
FIG. 2E

APPARATUS FOR DIVIDING AND STABILIZING CARGO IN THE BED OF PICK-UP TYPE VEHICLES

CROSS REFERENCES TO RELATED APPLICATIONS

This patent is based upon a Provisional Patent application, Ser. No. 60/006999 filed Nov. 20, 1995

BACKGROUND

1. Field of Invention

The subject invention is in the field of securing or bracing various types of cargo in a pick-up type vehicle.

2. Description of Prior Art

Since the development of pick-up type vehicles, their popularity and usefulness has increased dramatically. Today, more and more people are buying these vehicles to fulfill their everyday needs. With the progress in comfort, maneuverability, and appearance, these vehicles have become even more popular.

In respects to the bed of the vehicle, there has always been a problem of securing transported cargo. Whenever the driver accelerates, brakes, or turns, the cargo slides or shifts, possibly becoming damaged or damaging the interior walls of the bed.

Several ideas have been developed to handle such problems. Each work to a certain degree, but all have some shortcomings that reduce their effectiveness.

U.S. design Pat. No. D248,228 to ROBERTSON, DONALD KEIR (Jun. 20, 1978), U.S. design Pat. No. D300734 to Kruitbosch, John (Apr. 18, 1989), U.S. Pat. No. 4,834,599 to Gordon, Larry T. et al. (May 30, 1989), which show cargo type supports/restraints, or the like, are only good for stabilizing cargo in one direction of the bed and adjustments are minimal.

U.S. Pat. No. 4,917,429 to Giger, John D. (Apr. 17, 1990), U.S. Pat. No. 5,044,682 to Wayne, Mark (Sep. 03, 1991), U.S. Pat. No. 5,265,993 to Wayne, Mark (Nov. 30, 1993), show truck bed divider systems/assemblies, or the like, that require a certain configuration of the bed walls, or specific bed sizes. They also lack the adjustments that may be necessary to tightly secure the cargo. And lastly, they are large and bulky and possibly too cumbersome for some people to setup and/or adjust.

OBJECTS AND ADVANTAGES

Several objects and advantages of the present invention are to provide a method and apparatus of dividing and securing cargo in the bed of a pick-up type vehicle.

It is another object of invention to be adjustable to secure any shape of cargo that is to be transported.

It is still another object of invention to provide a method of securing cargo without the need of drilling holes in the bed walls, bed liner walls, or the vehicle's bed.

It is still another object of the invention to be light in weight as so it can be moved, adjusted, or removed with little effort.

It is still another object of the invention to be easily collapsible for a minimal amount of storage space.

It is still another object of the invention to not only secure cargo in the primary location of the support, but also in the secondary locations between the supports and between the supports and the bed walls.

Still further objects and advantages will become apparent from a consideration of the ensuing description and accompanying drawings.

BRIEF DESCRIPTION OF THE DRAWINGS

FIG. 2 is a top view of the invention and FIGS. 2A–2E are illustrations of the simple components of the embodiment.

Figure 1:
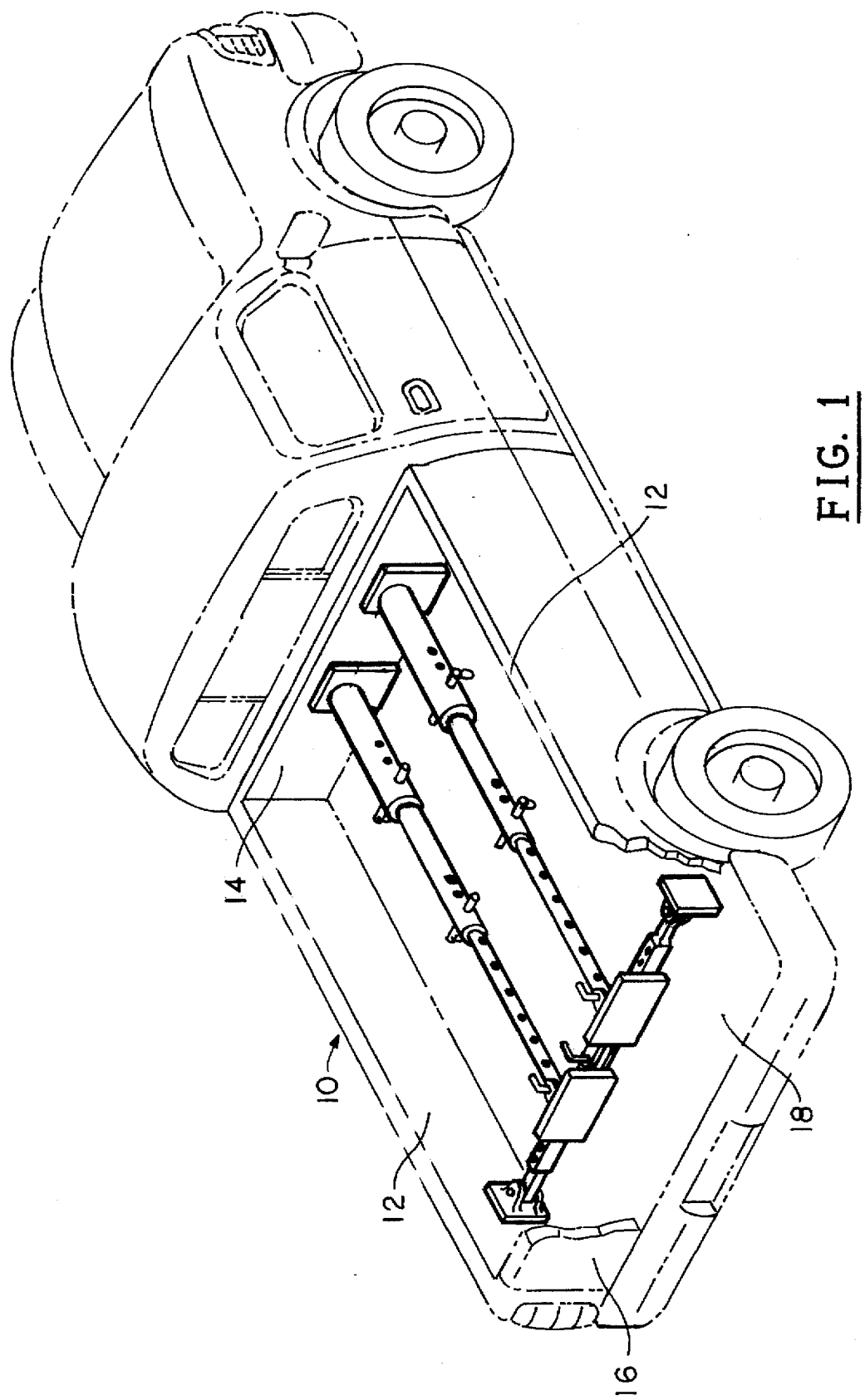
FIG. 1 is a perspective view illustrating the elements of the invention shown in extended positions inside a pick-up type vehicle 10.

Reference Numerals 10 pick-up type vehicle
12 interior side walls
14 interior front wall
16 tailgate
18 bed surface
20 primary lateral assembly
21 swivel plate
22 swivel plate pin
23 secondary lateral arm
24 spring detent pin
25 primary lateral arm
26 buttress plate
27 tit part
28 center locking swivel hinge
29 center locking swivel pin
30 top plate
31 bottom plate
32 center locking bolt handle
33 washer
34 nut
35 tangential arm locking assembly
36 flange plate
37 top "L" shaped flange
38 bottom "L" shaped flange
39 flange bolt
40 flange washer
41 tangential locking bolt handle
42 tangential washer
43 tangential nut
44 star grip
45 tangential arm assembly
46 tangential arm one
47 tangential arm two
48 tangential arm three
49 pull pin
50 tangential end plate

SUMMARY

The present invention provides a method and apparatus to divide and secure cargo in the bed of a pick-up type vehicle through arms and locking assemblies,

PREFERRED EMBODIMENT-DESCRIPTION

The present invention as seen in FIG. 1 is the preferred embodiment for securing cargo in a pick-up type vehicle 10. The preferred embodiment is discussed hereafter.

FIG. 1 is a perspective view of a pick-up type vehicle 10. This includes two interior side walls 12, interior front wall 14, and tailgate 16, that may possess a designed or flat surface or that is fitted with a bed liner. The present invention is suitable for any of these types of surfaces.

Within the vehicle's bed 10 is a perspective view of the preferred embodiment shown extended to interior side walls 12, and interior front wall 14, and is positioned on top of the bed surface 18.

Referring to FIG. 2, a detailed top view of the preferred embodiment and its construction and relationship is illustrated. There are two identical primary lateral assemblies 20. Each comprises a swivel plate 21, a swivel plate pin 22, a secondary lateral arm 23, a spring detent pin 24, a primary lateral arm 25, and a buttress plate 26.

Swivel plate 21 has a flat surface on one side and two perpendicular brackets on the other. These brackets may have been cast or molded with the plate or portions of the plate may have been stamped through and bent 90 degrees to form such brackets. Holes are bored through each of these brackets on the same center line. These holes are fitted with a singular swivel plate pin 22. This pin may be of a rivet or bolt and nut assembly. Swivel plate pin 22 is used to attach secondary lateral arm 23, by passing through a hole that is bored through one end of secondary lateral arm 23, the two bracket holes in the swivel plate 21. Secondary lateral arm 23, and primary lateral arm 25 are hollow square shaped rods with holes bored through their top sides at various intervals. Secondary lateral arm's outside dimensions are slightly smaller than the inside dimensions of primary lateral arm 25, to allow the secondary lateral arm 23, to slide freely inside primary lateral arm 25. Detent pin 24 is positioned inside the secondary lateral arm 23. Tit pad 27 may be attached by rivet or molded to the spring detent pin 24. Tit part 27 will protrude through one of the topside holes on the secondary lateral arm 23, and through a topside hole on primary lateral arm 25, to lock and allow adjustment of the primary lateral assembly 20. On one side of the primary lateral arm 25 is buttress plate 26. Buttress plate 26 is spot welded to primary lateral arm 25. Buttress plate 26 will be approximately two inches shorter in length than the primary lateral arm 25.

Figure 3:
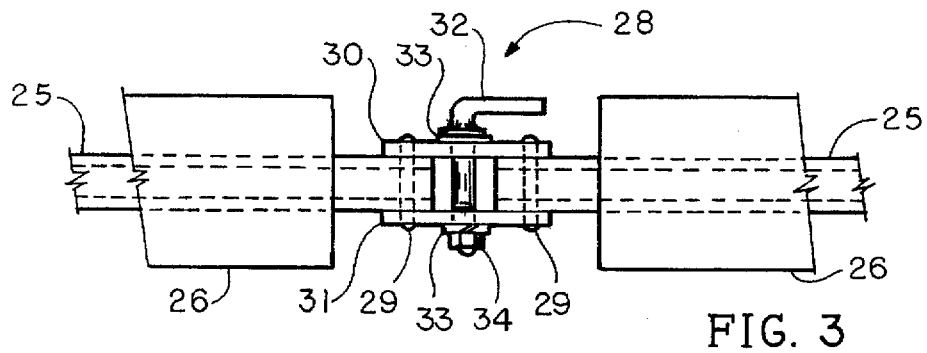
FIGS. 3 and 3A are enlarged illustrations of the side and top views respectively of the center primary lateral locking hinge 28, shown in FIG. 2.

These two identical primary lateral assemblies 20 are each connected by a center locking swivel hinge 28, shown in FIG. 3. In one end of each of the primary lateral arms 25 is a vertical hole bored through for center locking swivel pin 29 to pass through connecting each primary lateral assembly 20 to each end of the center locking swivel hinge 28. Center locking swivel pin 29 may be a rivet or bolt and nut assembly.

Figure 3A:
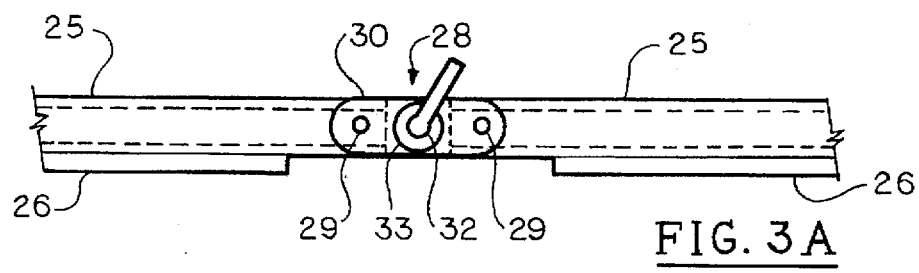

FIG. 3 and 3A show respectively a front and top view of the center locking swivel hinge 28. Components of center locking swivel hinge 28 are: two center locking swivel pins 29, a top plate 30, a bottom plate 31, a center locking bolt handle 32, two washers 33, and a nut 34.

A hole is bored through both ends of these two identical plates, top plate 30, and bottom plate 31, to accommodate center locking swivel pins 29. These holes will be slightly larger than center locking swivel pin 29, that passes through one of those two holes in top plate 30, and then through primary lateral arm 25, and then through bottom plate 31. The second center locking swivel pin 29 follows the same process thereby connecting the two primary lateral assemblies 20, to the center locking swivel hinge 28. A third hole is bored through the center of top plate 30, and bottom plate 31, and these holes share the same center line. These holes are slightly larger than the shank part of center locking bolt handle 32 to allow rotation. Center locking bolt handle 32 passes through washer 33, then through the center hole of top plate 30, then through the center hole in bottom plate 31, then through washer 33, and is then threaded into nut 34.

Figure 4:
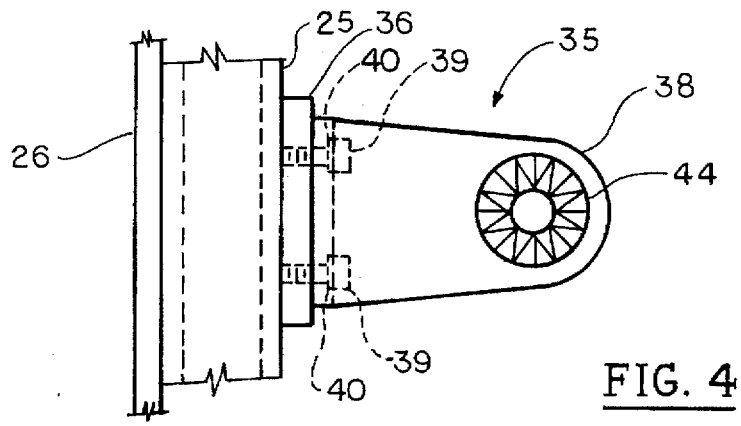
FIG. 4 is an enlarged illustration of the top view of the bottom tangential locking swivel hinge 35 with parts removed for clarity.
Figure 4A:
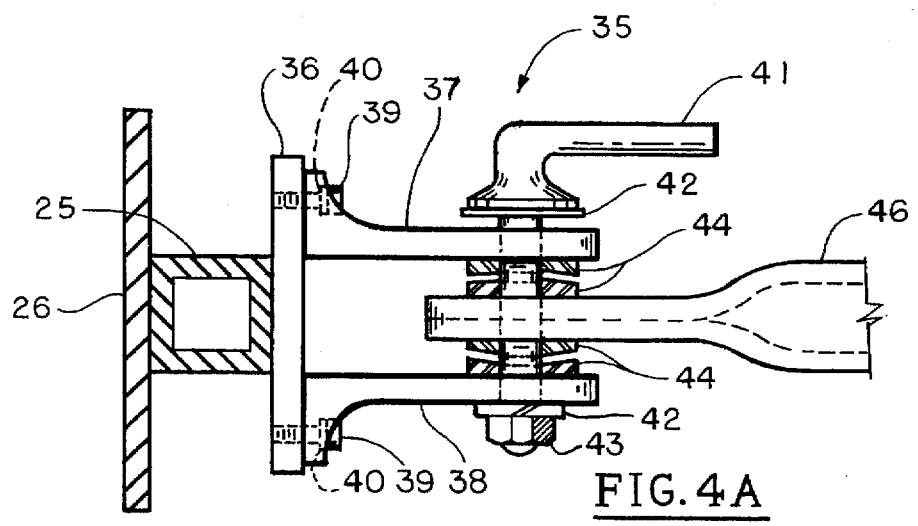
FIG. 4A is the complete side view of the tangential locking swivel hinge 35, both shown in FIG. 2.

FIG. 4 and 4A show a top and side view of the tangential arm locking assembly 35. There are two identical tangential arm locking assemblies 35. Each comprising: a flange plate 36, a top "L" shaped flange 37, a bottom "L" shaped flange 38, four flange bolts 39, four flange washers 40, a tangential locking bolt handle 41, two tangential washers 42, a tangential nut 43, and star grips 44.

Tangential arm locking assembly 35 is centered on one side of primary lateral arm 25, with buttress plate 26 located on the other side of primary lateral arm 25, shown in FIG. 2 and FIG. 4.

Flange plate 36, may be square in shape and has flat surfaces on both sides and is spot welded to primary lateral arm 25. Flange plate 36 has four holes bored through which are threaded. The upper two holes are to accommodate top "L" shaped flange 37. Top "L" shaped flange 37 has two holes bored through so one flange bolt 39, fitted with flange washer 40, may pass through one hole in the top "L" shaped flange 37, and thread into one of the two holes in flange plate 36. The second bolt follows the same procedure for the second hole. Bottom "L" shaped flange 38, uses the two lower threaded holes on flange plate 36. The bottom "L" shaped flange 38 is identical to top "L" shaped flange 37. Bottom "L" shaped flange 38 is also connected through the same process as the top "L" shaped flange 37, to flange plate 36. The extended portions of top "L" shaped flange 37, and bottom "L" shaped flange 38 are perpendicular to flange plate 36. Both top "L" shaped flange 37, and bottom "L" shaped flange 38, have a hole bored through and have the same center line. These holes are slightly larger than the shank part of tangential locking bolt handle 41. This is to allow rotation of tangential locking bolt handle 41. Surrounding the hole on the bottom side of the top "L" shaped flange 37 is a stamped or cast star grip 44. Surrounding the hole on the top side of the bottom "L" shaped flange 38 is a stamped or cast star grip 44. Star grips 44, have spaced peaks and valleys that when meshed with another star grip 44, creates firm locking positions, in this case, of the tangential arm assembly 45. Tangential locking bolt handle's 41, shank part passes through tangential washer 42, then through top "L" shaped flange 37, then through tangential arm one 46, then through bottom "L" shaped flange 38, then through tangential washer 42, and is then threaded into tangential nut 43.

FIG. 2 shows a top view of a tangential arm assembly 45. There are two identical tangential arm assemblies 45. Each comprises, a tangential arm one 46, a tangential arm two 47, a tangential arm three 48, two pull pins 49, and a tangential end plate 50.

Tangential arm one 46, and tangential arm two 47, and tangential arm three 48, are hollow and of tubular shape and have multiple horizontal holes bored through at various intervals. Tangential arm one 46 is squared on one end and has a vertical hole bored through that same end. Surrounding this hole on the top and bottom sides of tangential arm one 46 is a stamped or cast star grip 44. Tangential arm one's 46, outside dimensions slightly smaller than the inside dimensions of tangential arm two 47. Tangential arm two's 47, outside dimensions are slightly smaller than the inside dimensions of tangential arm three 48. This allows tangential arm one 46, to slide into tangential arm two 47, and tangential arm two 47, to slide into tangential arm three 48. A pull pin 49, will pass through one of the horizontal holes in tangential arm two 47, and through one of the horizontal holes in tangential arm one 46. A second pull pin 49, will pass through one of the horizontal holes in tangential arm three 48, and through one of the horizontal holes in tangential arm two 47. Located on the end of tangential arm three 48 is tangential end plate 50. Tangential end plate 50 is flat on one side and has a protruding nipple approximately one inch on the other. The nipple is round and may be molded or cast to tangential end plate 50. The nipple's outside dimensions are a few thousands of an inch smaller than the inside dimensions of tangential arm three 48. However, tangential end plate 50, may also be constructed to look, work, and be connected to tangential arm three 48, like the swivel plate 21, is to secondary lateral arm 23. All parts in this embodiment may be made from a variety of materials including wood, plastic, or some type of metal, or the like.

PREFERRED EMBODIMENT - OPERATION

Operation of the device of the present invention will be described further with reference to FIGS. 1 to 4.

FIG. 1 shows one primary area for securing cargo between tailgate 16, and the primary lateral assemblies 20, shown in FIG. 2. The present invention may also be adjusted to secure cargo in the primary area between the interior side walls 12, and the primary lateral assemblies 20, or between the interior front wall 14, and the primary lateral assemblies 20.

FIG. 1 also shows three more areas where cargo may also be secured. These are the secondary cargo locations. The secondary locations are between the two interior side walls 12, and each tangential arm assembly 45, shown in FIG. 2, or the device maybe repositioned to secure cargo between the interior front wall 14, tailgate 16', and each tangential arm assembly 45. Cargo may also be secured between the tangential arm assemblies 45.

FIG. 2 shows a top view of the embodiment with detailed views of the simpler parts shown in FIGS. 2A–2E. The preferred embodiment is comprised of four main components and are listed as follows: two primary lateral assemblies 20, one center locking swivel hinge 28, two tangential arm locking assemblies 35, and two tangential arm assemblies 45.

The two primary lateral assemblies 20 are identical in design and assembly. Swivel plates 21 have two brackets protruding on one side of each plate with a vertical hole bored through them. The distance between the two brackets will be slightly wider than the thickness of the secondary lateral arm 23. To connect swivel plate 21, to secondary lateral arm 23, swivel plate pin 22 passes through one bracket hole, then the end vertical hole on secondary lateral arm 23, then through the second bracket hole on swivel plate 21. Swivel plate 21 will be able to rotate approximately 180 degrees on a vertical axis, and will allow swivel plate 21 to remain flat against either of the interior side walls 12, or interior front wall 14, or tailgate 16. Each swivel plate 21 will be located on each end of each lateral arm 23. Secondary lateral arm 23 will slide inside of primary lateral arm 25. Spring detent pin 24 is positioned inside of secondary lateral arm 23. Tit part 27 will protrude through one of the topside holes on each secondary lateral arm 23, and primary lateral arm 25. To allow adjustment of the primary lateral assembly 20, depress tit part 27, down slightly below the surface of primary lateral arm 25, then slide the secondary lateral arm 23, in or out. Tit part 27 of spring detent pin 24 will pop through the next hole it passes. Continue the process until you have reached the desired length. Buttress plate 26 is spot welded to one side of each of the primary lateral arms 25, and will be of reasonable height for support of the cargo. The face on the cargo containment side of buttress plate 26, will be slightly textured to help prevent the shifting of cargo. Buttress plate 26, will be slightly shorter in length than the primary lateral arm 25, to allow rotation of the center locking swivel hinge 28, and the center locking bolt handle 32, shown in FIG. 3, and to allow movement of the primary lateral assembly 20. Buttress plate 26 will also rest on bed surface 18. This will conclude part of the process necessary of securing cargo with the primary lateral assemblies 20.

FIG. 3 shows detailed views of the center locking swivel hinge 28, and how it is connected to primary lateral arms 25. Primary lateral arms 25 have a hole bored vertically through one end of each of their ends. These holes will be slightly larger in diameter than the diameter of center locking swivel pin 29.

The center locking swivel hinge 28 has eight components and are discussed hereafter. Top plate 30, and bottom plate 31 have holes bored through each end that are slightly larger than the diameter of center locking swivel pin 29, to allow independent rotation of primary lateral arm 25, and center locking swivel hinge 28. Each center locking swivel pin 29 will pass through one of the end holes of top plate 30, and through the end hole of primary lateral arm 25, and through one of the end holes of bottom plate 31, to connect each of the primary lateral assemblies 20. The two center locking swivel pins 29, will be slightly longer than the combined thickness of top plate 30, primary lateral arm 25, and bottom plate 31, to allow independent rotation of primary lateral arm 25, and the center locking swivel hinge 28. In the center of top plate 30, and bottom plate 31 is a hole with the diameter slightly larger than the diameter of the shank of the center locking bolt handle 32, to allow rotation of center locking bolt handle 32.

Center locking bolt handle 32 is fitted with washer 33, and then passes through the center hole of top plate 30, and then through bottom plate 31, and then fitted with another washer 33, then threaded into nut 34. Center locking bolt handle's 32, shank is slightly longer than the combined thickness of the two washers 33, and top plate 30, and bottom plate 31, and nut 34. Rotating the canter locking bolt handle 32, approximately ½ turn will compress the two washers 33, and top plate 30, and bottom plate 31, and the two primary lateral arms 25, together and lock in the desired position the two primary lateral assemblies 20. This concludes the second process of using center locking swivel hinge 28.

FIG. 4 shows a detailed view of tangential arm locking assembly 35, and how it is connected to primary lateral assembly 20, and to tangential arm assembly 45. There are two identical tangential arm locking assemblies 35, and each comprises fifteen parts which are discussed hereafter.

Each flange plate 36 is centered and spot welded to each of the primary lateral arms 25, and are on the opposite side from buttress plate 26. Each flange plate 36 has four holes bored through and threaded to attach top "L" shaped flange 37, and bottom "L" shaped flange 38. Top "L" shaped flange 37 has two holes bored through that are slightly larger than flange bolt 39. This allows one of the two flange bolts 39, fitted with one flange washer 40, to pass through one of the two top holes on the top "L" shaped flange 37, and thread into flange plate 36. The second flange bolt 39, also fitted with flange washer 40, passes through the second hole in the top "L" shaped flange 37, and is threaded into the second upper hole in flange plate 36. Bottom "L" shaped flange 38 is identical to top "L" shaped flange 37, so the connection process of bottom "L" shaped flange 38, to flange plate 36 is the same process that was done on the top "L" shaped flange 37. Moving out on the long part of the "L" on the top "L" shaped flange 37, and the bottom "L" shaped flange 38, that is horizontal and perpendicular to flange plate 36 is a hole bored through both the top "L" shaped flange 37, and the bottom "L" shaped flange 38. These two holes have the same center line and will be slightly larger in diameter than the diameter of the shank part of the tangential locking bolt handle 41. This will allow the rotation of tangential locking bolt handle 41, that passes through the hole in both the top "L" shaped flange 37, and bottom "L" shaped flange 38. Both top "L" shaped flange 37, and bottom "L" shaped flange 38, has star grip 44, stamped or cast around each of these same holes. One star grip 44, on the bottom side of top "L" shaped flange 37, and one star grip 44, is on the top side of the bottom "L" shaped flange 38. When tangential locking bolt handle 41, is fitted with tangential washer 42, and passes through top "L" shaped flange 37, and through tangential arm one 46, and then through bottom "L" shaped flange 38, and through another tangential washer 42, and then threaded into tangential nut 43, each of these two star grip 44, will mesh with star grips 44, located on the upper and lower sides of tangential arm one 46, when tightened by the rotation of tangential locking bolt handle 41, into tangential nut 43. This rotation will be approximately a ½ turn and will then lock the tangential arm assembly 45, in the desired position. This will conclude description of the use of tangential arm locking assembly 35.

FIG. 2 shows tangential arm assembly 45, and is comprised of two identical arm assemblies. Each tangential arm assembly 45 has seven parts which are discussed hereafter.

Tangential arm one 46, is connected to tangential arm locking assembly 35, by tangential locking bolt handle 41. One end of tangential arm one 46 is a square hollow rod with a vertical hole bored through near the end. The remaining length is tapered into a hollow tubular rod. On the top and bottom sides of tangential arm one 46, around this hole is stamped or cast star grip 44. On the tubular end of tangential arm one 46, horizontal holes will be bored through at various increments. Tangential arm two 47, and tangential arm three 48, are also tubular and have horizontal holes bored through at various increments. Tangential arm one's outside dimensions will be slightly smaller than the inside dimensions of tangential arm two 47. This will allow tangential arm one 46, to slide into tangential arm two 47. Tangential arm two's outside dimensions will be slightly smaller then the inside dimensions of tangential arm three 48. This will allow tangential arm two 47, to slide inside tangential arm three 48. Two pull pins 49 will be necessary to set the desired length of one of the tangential arm assemblies 45. A pull pin 49 will be inserted into one of the horizontal holes bored through tangential arm two 47, and will also pass through one of the horizontal holes bored through tangential arm one 46, that is inserted inside tangential arm two 47. The second pull pin 49 will pass through one of the horizontal holes bored though tangential arm three 48, and through one of the horizontal holes bored through tangential arm two 47, that is inserted inside tangential arm three 48. This will lock the telescopic tangential arm assembly 45, to the desired position. Located in the end of tangential arm three 48 is a tangential end plate 50. Tangential end plate 50 has a nipple on one side of the plate and is tightly fitted inside the end of tangential arm three 48 so it is not easily removed or misplaced. Tangential end plate 50, may also be designed to look, attach and operate like the swivel plate 21, for strength and better adjustment. Tangential end plate 50 rests on bed surface 18, and can be positioned against any of the interior side walls 12, or interior wall 14, or tailgate 16.

Conclusions, Ramifications, and Scope

Accordingly it can be seen that I have provided a method and apparatus of dividing and securing cargo of any size or shape in a pick-up type vehicle that is effective and very simple to adjust. It is also lightweight and can be easily removed and reduced down to a small object that can be stored inside the vehicle.

Although the description above contains many specificities, these should not be construed as limiting the scope of the invention, but as merely providing illustrations of some of the presently preferred embodiments of this invention. Various other embodiments and ramifications are possible within its scope. For example, pick-up type vehicle 10, may have several different bed sizes and may require multiple sizes of cargo dividers. Users may also have needs for a heavy duty model which may require that the design change in types of material used and thickness of pads. Lastly, attachments may be used to perform specific tasks such as, containing five gallon buckets or fifty-five gallon drums.

Thus the scope of the invention should be determined by the appended claims and their legal equivalents, rather than by the examples given.

What is claimed is:

1. An apparatus for dividing and stabilizing cargo in a vehicle cargo bed, comprising:

first and second primary lateral assemblies, each said primary assembly comprising means for telescopically extending the length of the respective primary assembly for secure engagement with a wall of the cargo bed;

center locking swivel hinge means for hingedly and selectively lockingly connecting the primary lateral assemblies together;

first and second tangential arm assemblies, each said tangential arm assembly comprising means for telescopically extending the length of the respective tangential arm assembly for secure engagement with a wall of the cargo bed;

first and second tangential arm locking assembly means for hingedly and selectively lockingly connecting the tangential arm assemblies to the primary lateral assemblies wherein the first tangential arm locking assembly means connects the first tangential arm assembly to the first primary lateral assembly and the second tangential arm locking assembly means connects the second tangential arm assembly to the second primary lateral assembly;

said center locking swivel hinge means including a swivel pin connected to a respective end of each primary lateral assembly and connecting means connecting each said swivel pin such that said respective ends of each primary lateral assembly are connected; and wherein each said tangential arm locking assembly means and said center locking swivel hinge means comprise a locking bolt handle for selective locking of each said locking assembly means and said locking swivel hinge means.

* * * * *